UNITED STATES PATENT OFFICE.

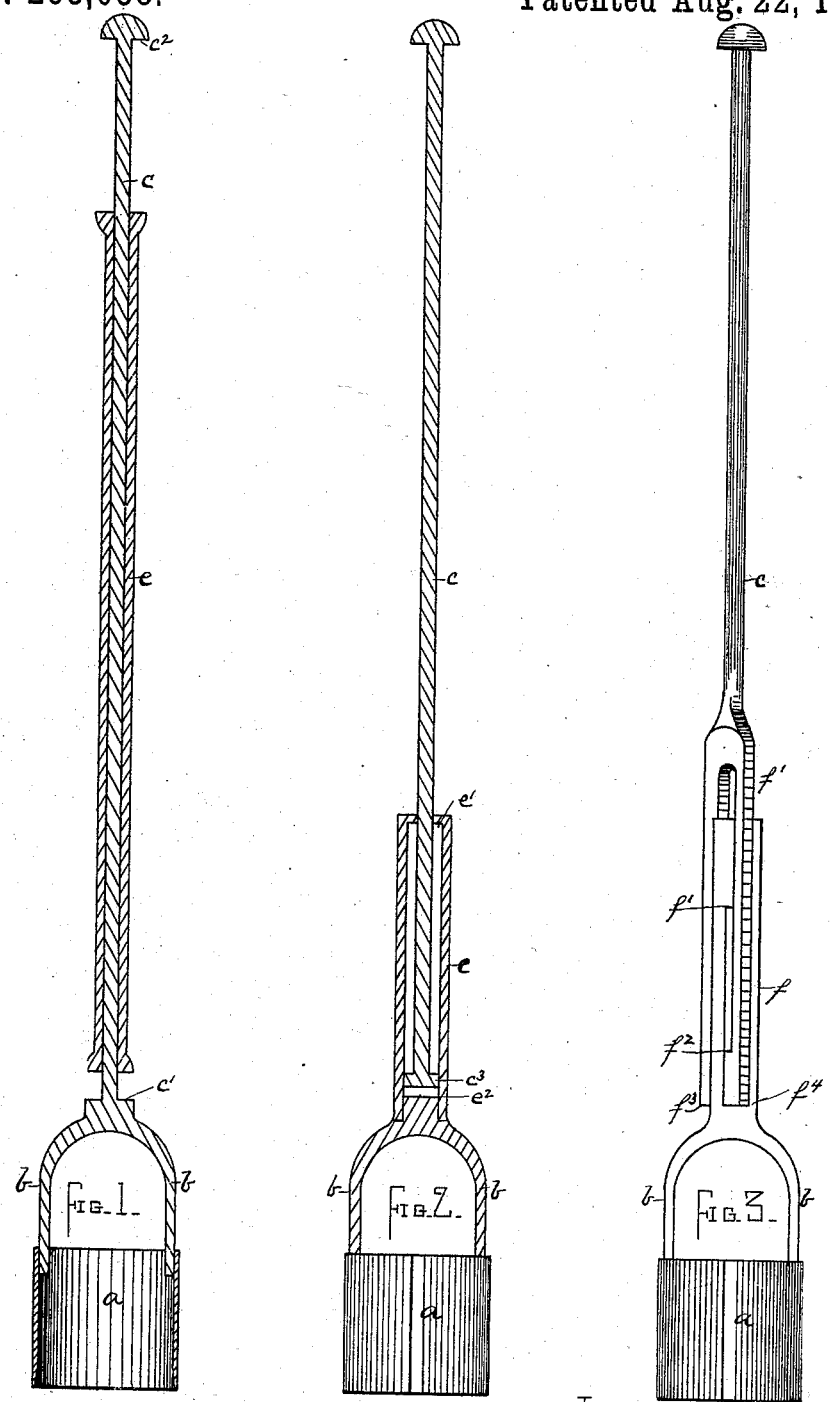

JAMES A. FLEMING, OF DENVER, COLORADO.

POST-HOLE DIGGER.

SPECIFICATION forming part of Letters Patent No. 263,038, dated August 22, 1882.

Application filed April 1, 1882. (No model.)

*To all whom it may concern:*

Be it known that I, JAMES A. FLEMING, of Denver, in the county of Arapahoe and State of Colorado, have invented a new and useful Improvement in Post-Hole Diggers; and I do hereby declare the following to be a full, clear, and exact description thereof.

These diggers are used for the purpose of making holes in the ground for the insertion of telegraph-poles, fence and other posts, and those in general use are made of the form substantially as shown in the drawings, with a body, $a$, of spring metal capable of expansion and a clasping action upon its load, and a suitable handle. They are ordinarily driven into the ground by a separate maul, or by hand, in the latter case the operator raising the digger and driving it into the ground by main force. One thrust will not ordinarily put it down to the required depth to fill the body, and so it is customary to work it and force it down by main force. After removing the first cut the digger is again inserted into the hole and driven down in like manner, and the operation just described repeated until the hole is of the required depth. It is almost impossible to strike the tool in the same place each time, and there is more or less side cutting done at each blow, until the hole gets of sufficient depth to act as a guide to direct the digger, and then the friction of the sides upon the implement is such as to waste considerable of the force used in driving it down. In soft or muddy ground the raising and dropping of the implement causes the water and mud to splash up upon the operator, and makes it a very disagreeable operation. In withdrawing the implement from the hole it often sticks at the bottom and requires the exertion of considerable strength to loosen it. Where the digger is driven into the ground by the use of a separate maul or hammer, it requires the carrying of the maul by the workman and the holding of the instrument in a vertical position while it is being driven into the ground. This necessitates usually the employment of a helper in the use of the tool, as it is difficult for the person using the maul to also hold the digger, and it is impossible for him to exert the proper strength in driving when compelled to keep the digger in a vertical position.

My invention is designed to obviate these difficulties; and it consists in supplying the implement with a jarring attachment, by which it may be driven down into and loosened from the hole.

To enable others skilled in the art to make and use my invention, I will now describe it by reference to the accompanying drawings, in which—

Figure 1 shows a tubular jarring device; Fig. 2, a telescopic device; Fig. 3, a link-jarring device.

In the drawings, the body $a$, arms $b$, and rod $c$ are of the usual construction. In Fig. 1 I apply to the rod $c$, preferably at or near its junction with the arms $b$, a knocking-head, $c'$, which is preferably made of steel or other hard metal, and on the rod I a place a tubular jarring device, $e$, the lower end of which is preferably made of hardened metal or steel. At the upper end of the rod $c$ is a header-knob, $c^2$, which is also preferably of steel or other hardened metal, and the upper end of the jarring device $e$ is provided with a knocking-head, also preferably made of steel or other hardened metal. The extent of movement of the knocker $e$ upon the rod $c$ may be varied according to the wish of the constructer or operator. I would suggest, however, to make it from twelve to fifteen inches.

Instead of making the knocking-heads of hard metal, they may be constructed of the material of which the rest of the implement is made, and the meeting faces may be fitted with leather or other suitable washers, so as to prevent the upsetting of the knocking-heads.

The rod $c$ and knocking-tube $e$ are preferably made of wrought-iron. In Fig. 2 the tube $e$ is attached to the arms $b$, and the rod $c$ is movable in the tube. On the lower end of the rod $c$ is a head or disk, $c^3$, which operates against the heads $e'$ $e^2$, one at the lower and the other at the upper end of the tube $e$. The head $e'$ may be attached to the tube $e$, either by a screw-thread or by welding, after the rod has been put in place.

In Fig. 3 I show the handle of the digger formed of a pair of links, $f f$, substantially similar in construction and operation to the links used for drilling oil-wells. One of these links $f$ is welded or otherwise fastened to the arms $b$.

The knocking-heads, which are of steel or other hardened metal, are shown at $f'$ $f^2$ $f^3$ $f^4$. Other ways of attaching the jarring device to the digger may be suggested. For instance, instead of being a long tube, it may be a short one, and operate between shoulders or knocking-heads made on and secured to the handle $c$.

The advantages of my improvement are that it enables the tool to be placed and held in one position during its entire cut, and be driven down and loosened without the expenditure of much strength and exertion on the part of the operator, and it enables him to work in wet or marshy soil without the disagreeable splashing before mentioned. If desired, the tool may be made with the lower knocking-head alone. By having the upper knocking-head, $c'$, secured by means of a screw or otherwise the tubular knocker may be removed at pleasure and the tool used in the old way.

The characteristic feature which distinguishes my invention from prior devices is that the knocking or jarring device is mounted on or forms part of the handle, while prior diggers of the same class were driven into the earth by the blows of a separate maul or hammer.

What I claim as my invention, and desire to secure by Letters Patent, is—

1. A post-hole digger provided with a jarring device or knocker on or forming part of the handle, by means of which it may be driven into the earth, substantially as and for the purposes described.

2. A post-hole digger provided with a jarring device or knocker and upper and lower knocking-heads, by means of which it may be driven into the earth and loosened therefrom, substantially as and for the purposes described.

In testimony whereof I have hereunto set my hand this 29th day of March, A. D. 1882.

JAMES A. FLEMING.

Witnesses:
T. B. KERR,
J. M. ROURKE.